(12) United States Patent
Haim et al.

(10) Patent No.: US 10,894,609 B2
(45) Date of Patent: Jan. 19, 2021

(54) FLAMMABILITY RESISTANT VISUAL DISPLAY ASSEMBLY

(71) Applicant: HONEYWELL INTERNATIONAL INC., Morris Plains, NJ (US)

(72) Inventors: Steven Haim, Glendale, AZ (US); Mark Struebel, Desert Hills, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 207 days.

(21) Appl. No.: 16/100,470

(22) Filed: Aug. 10, 2018

(65) Prior Publication Data

US 2020/0047912 A1 Feb. 13, 2020

(51) Int. Cl.
*B64D 43/00* (2006.01)
*G02F 1/1333* (2006.01)

(52) U.S. Cl.
CPC ....... *B64D 43/00* (2013.01); *G02F 1/133308* (2013.01); *G02F 1/133385* (2013.01); *G02F 2001/13332* (2013.01); *G02F 2001/133314* (2013.01); *G02F 2201/50* (2013.01)

(58) Field of Classification Search
None
See application file for complete search history.

(56) References Cited

U.S. PATENT DOCUMENTS

| 7,492,609 | B2 | 2/2009 | Wang et al. |
|---|---|---|---|
| 2002/0003592 | A1 | 1/2002 | Hett et al. |
| 2006/0268193 | A1* | 11/2006 | Wang ................ G02F 1/133308 349/59 |
| 2011/0013114 | A1* | 1/2011 | Dunn ................ G02F 1/133385 349/61 |
| 2011/0063265 | A1 | 3/2011 | Kim |
| 2012/0105335 | A1 | 5/2012 | Suddreth et al. |
| 2013/0162506 | A1 | 6/2013 | Kim et al. |
| 2014/0368769 | A1 | 12/2014 | Lee et al. |
| 2015/0265018 | A1 | 9/2015 | Balourdet |
| 2017/0343856 | A1 | 11/2017 | Grandclerc et al. |

* cited by examiner

*Primary Examiner* — Phu Vu
(74) *Attorney, Agent, or Firm* — Lorenz & Kopf, LLP

(57) ABSTRACT

An electronic unit defines an interior and includes a circuit card assembly disposed in the interior. An enclosure surrounds five sides of the interior. A sixth side of the interior is closed by a circuit card assembly. The circuit card assembly is coated with a metal layer configured to contain flame within the interior.

20 Claims, 5 Drawing Sheets

FLAMMABILITY RESISTANT VISUAL DISPLAY ASSEMBLY

TECHNICAL FIELD

The present invention generally relates to electronic assemblies and more particularly relates to liquid crystal and other visual display assemblies for use in vehicles such as aircraft.

BACKGROUND

Electronic assemblies serve a variety of purposes and include a wide array of components for carrying out the functions needed of the assembly. One example involves visual displays such as liquid crystal displays, that often include touch screen capability and are routinely used in place of analog displays and to replace traditional control mechanisms such as buttons, dials and switches to provide inputs to controlled systems. One area where visual displays are increasingly being used is in vehicles to provide information for controlling and monitoring various subsystems of those vehicles. For example, touch screen visual displays may be used in an automobile to control a navigation system or in aircraft to control communication systems, navigation systems, flight control systems, etc.

Electronic assemblies often have elements that are flammable when exposed to flame during testing or other conditions that could lead to ignition. In the case of visual displays, the assembly may include reflectors, brightness enhancement films, dual brightness enhancement films, polarizers, etc. In one application, DO-160—Environmental Conditions and Test Procedures for Airborne Equipment, is a standard that includes environmental testing procedures for avionics hardware, including for flammability. In the event that these materials are exposed to flame during testing, containing any resulting combustion to prevent spread or for self-extinguishment is generally desirable. Fabrication of visual display systems that are capable of containing internal combustion under these and real-world conditions is complicated and leads to relatively heavy devices.

Accordingly, it is desirable to manufacture a visual display system designed for flammability resistance that has improved manufacturability and lower weight. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description section of this disclosure. This summary is not intended to identify key or essential features of the claimed subject matter, nor is it intended to be used as an aid in determining the scope of the claimed subject matter.

In a number of embodiments, an electronic unit defines an interior and includes a circuit card assembly disposed in the interior. An enclosure surrounds five sides of the interior. A sixth side of the interior is closed by a circuit card assembly. The circuit card assembly is coated with a metal layer configured to contain flame within the interior.

In other embodiments, a visual display assembly for an instrument panel includes a front unit defining a first interior. A visual display panel has a transparent substantially non-flammable surface and is disposed on a first side of the visual display panel. A circuit card assembly is disposed on a second side of the visual display panel. A bezel surrounds four sides of the visual display panel. A rear unit defines a second interior and includes a case with five substantially closed sides and an open side that faces the front unit. Electronic devices are contained in the second interior and are coupled with the circuit card assembly. The front and rear units are disposed adjacent each other, with the circuit card assembly facing the open side. The circuit card assembly separates the first interior from the second interior and is coated with a metal layer to inhibit flame propagation between the first and second interiors and to contain flame within the first interior.

In additional embodiments, a visual display assembly for an instrument panel includes a front unit with a visual display panel. A transparent substantially non-flammable layer is disposed on one side of the visual display panel and a circuit card assembly is disposed on an opposite side. A surface of the layer faces out of the instrument panel. A bezel surrounds four sides of the visual display panel. A rear unit includes a case with five substantially closed sides and an open side that faces the front unit. Electronic devices are contained in the rear unit and are coupled with the circuit card assembly. The front and rear units are connected together. The circuit card assembly has a metal layer that closes the open side and separates the interiors of the front and rear units. The metal layer is configured to inhibit flame propagation between the interiors and to contain flame within the interior of the front unit.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Embodiments of a visual display assembly are disclosed herein that are constructed to contain any combustion that may occur, including testing induced combustion. As noted above, during environmental testing, visual display assemblies may be exposed to flame to evaluate their response. In an example described further below, a visual display assembly includes a front unit defining an interior space. The front unit includes visual display panel with a transparent panel disposed on its front viewing side. The transparent panel is made of a material that resists combustion. A circuit card assembly is disposed behind the visual display panel. A metal bezel surrounding four sides of the visual display panel and the circuit card assembly. A rear unit defines another interior space behind the front unit. The rear unit includes a case with five substantially closed sides and one open side that faces the front unit. The open side is open in the sense that it is not closed by a metal wall, until assembly to the front unit. Various electronic devices are contained in the interior of the rear unit and are coupled with the circuit card assembly. The front and rear units are assembled together, and the circuit card assembly faces into the one open side of the rear unit. The circuit card assembly is configured to separate the front and rear interiors and is coated with a metal on its rear surface to inhibit combustion propagation between the interiors and to contain any occurring combustion within the front unit.

Figure 1:
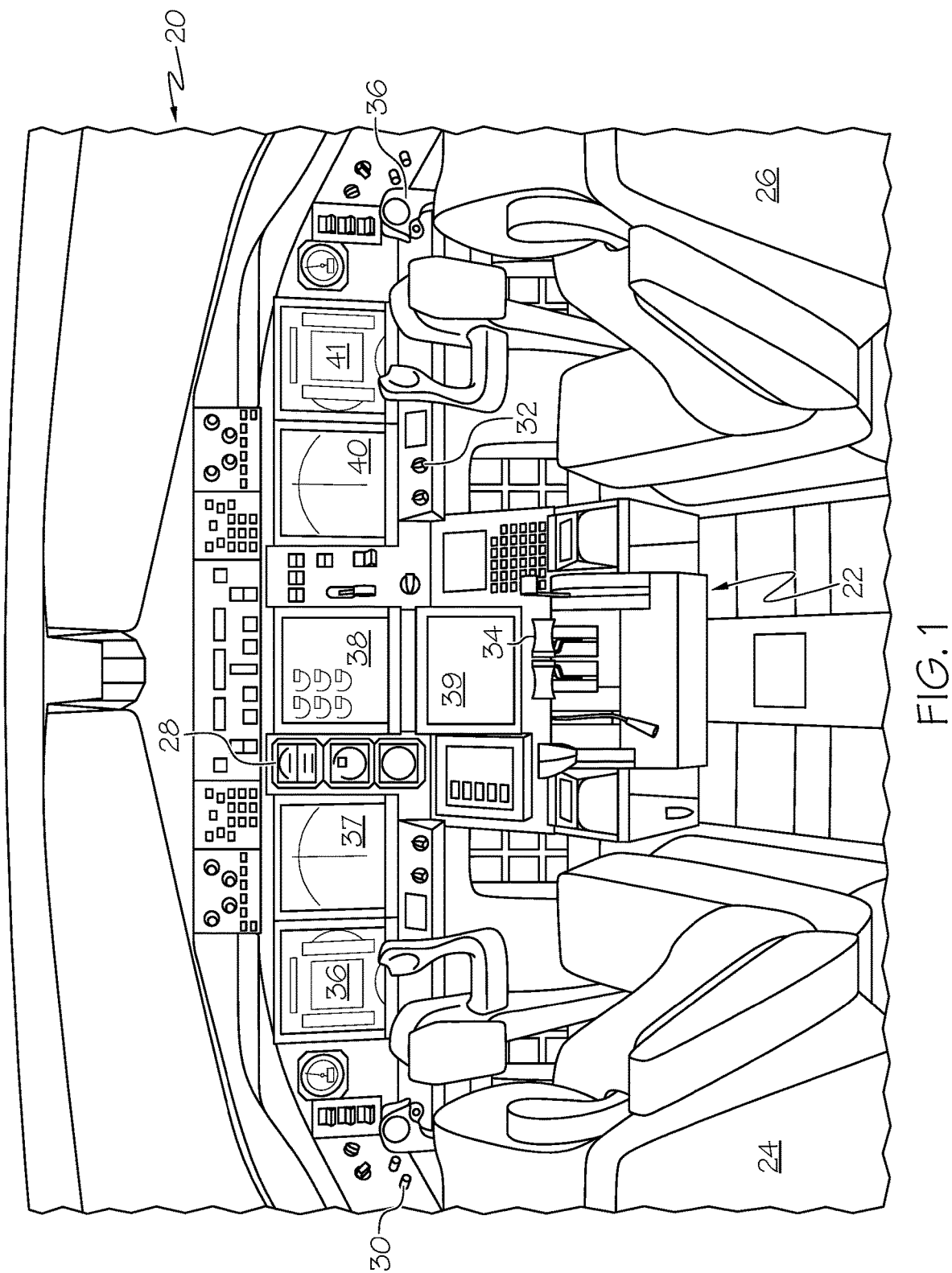
FIG. 1 is a fragmentary perspective view illustrating the inside of an aircraft viewing the cockpit area, in accordance with an exemplary embodiment.

Referring to FIG. 1, a fragmentary perspective view illustrates the inside of an exemplary aircraft cockpit 20. Although the context of the current disclosure is directed to visual display assemblies used in aircraft, it should be understood that the teachings herein pertain to visual display assemblies used in any type of vehicle including, but not limited to, land-based vehicles such as automobiles and trains as well as watercraft and spacecraft. Additionally, the teachings herein are not limited to vehicle applications. Rather, the teachings herein may also be used with displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various electronic units such as readouts 28 and various control features such as buttons 30, switches 32, throttle controls 34, and yokes 36. Also mounted on or in instrument panel 22 are electronic units in the form of visual display assemblies 36-41. The visual display assemblies 36-41 deliver information about the aircraft and may include touch capability to receive inputs. For example, a touch capable visual display assembly 36-41 may be configured to control landing gear deployment, flight control surface actuation, or radio and navigation system operations.

Figure 3:
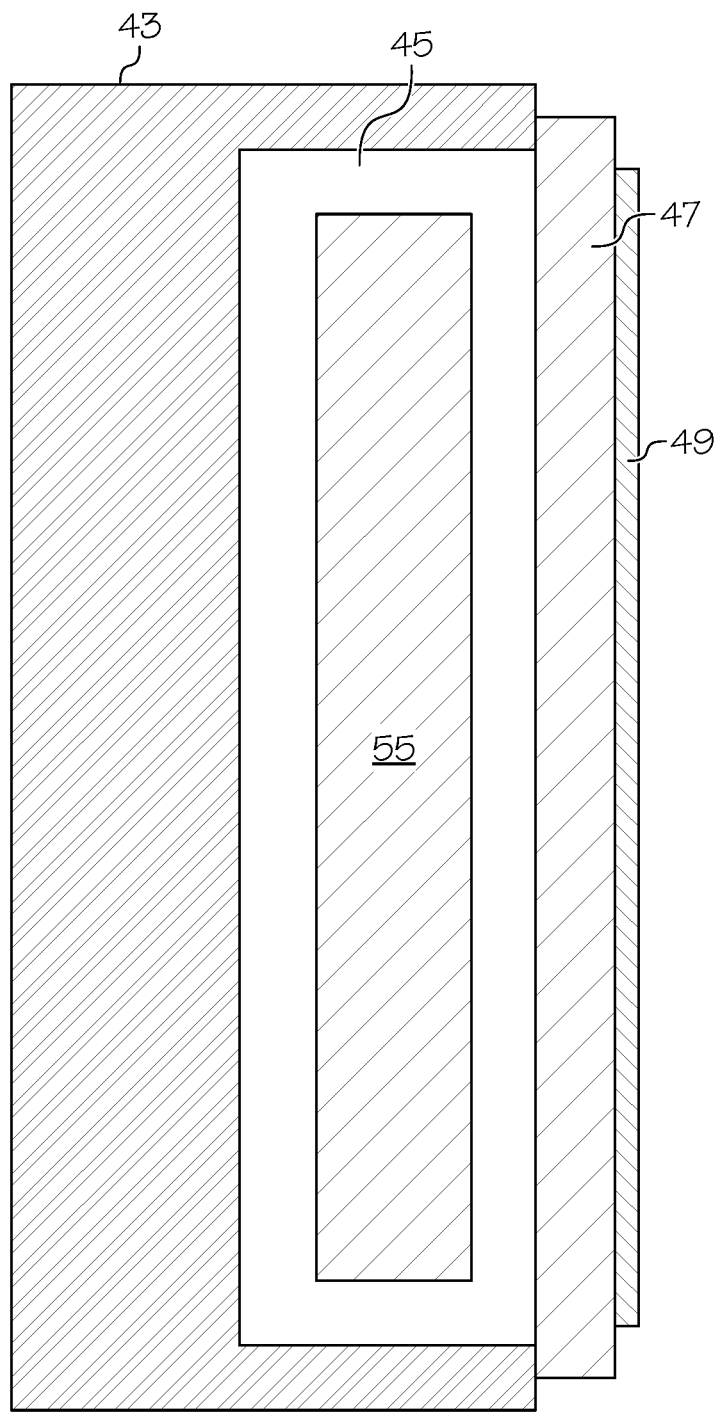
FIG. 3 is a schematic cross-sectional illustration of an electronic unit in the form of a visual display system, in accordance with an exemplary embodiment.

As shown in FIG. 3 in simplified schematic form, the electronic units of various types may include an enclosure 43 that surrounds five sides of an interior 45. The enclosure 43 may be constructed of metal or another flame-resistant material. A circuit card assembly 47 is disposed at least partially in the interior 45, or at an edge of the interior 45. A sixth side of the interior 45 is closed by the circuit card assembly 47. The circuit card assembly 47 is coated with a metal layer 49 configured to contain flame within the interior 45. The interior 45 contains internal componentry 55 that is flammable and may combust when exposed to flame. The enclosure 43 and the metal layer 49 provide a flame-resistant unit, which in the event of combustion of the internal componentry 55, contains the combustion from spreading outside the interior 45.

Figure 2:
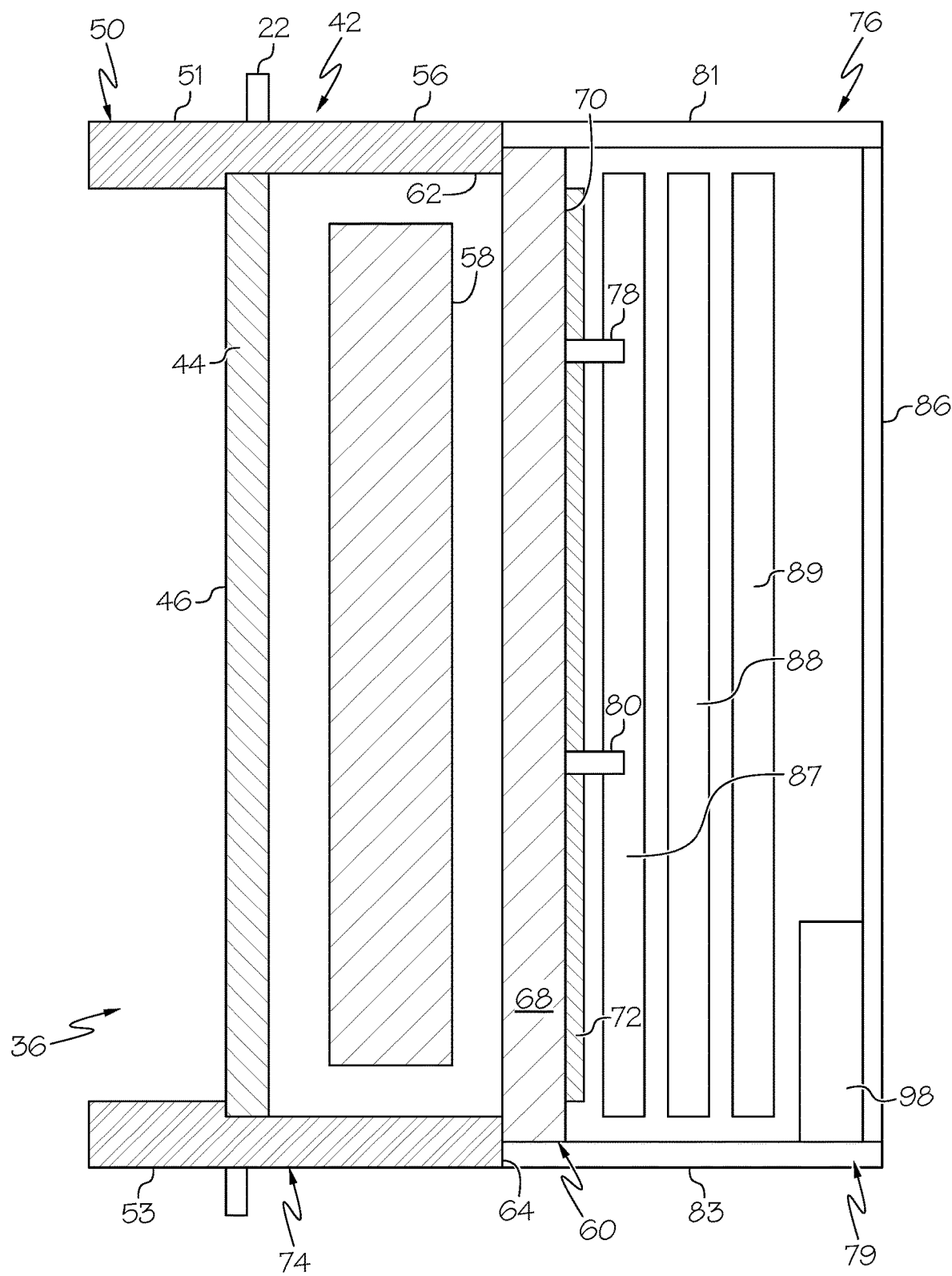
FIG. 2 is a schematic cross-sectional illustration of an electronic unit, in accordance with an exemplary embodiment.
Figure 4:
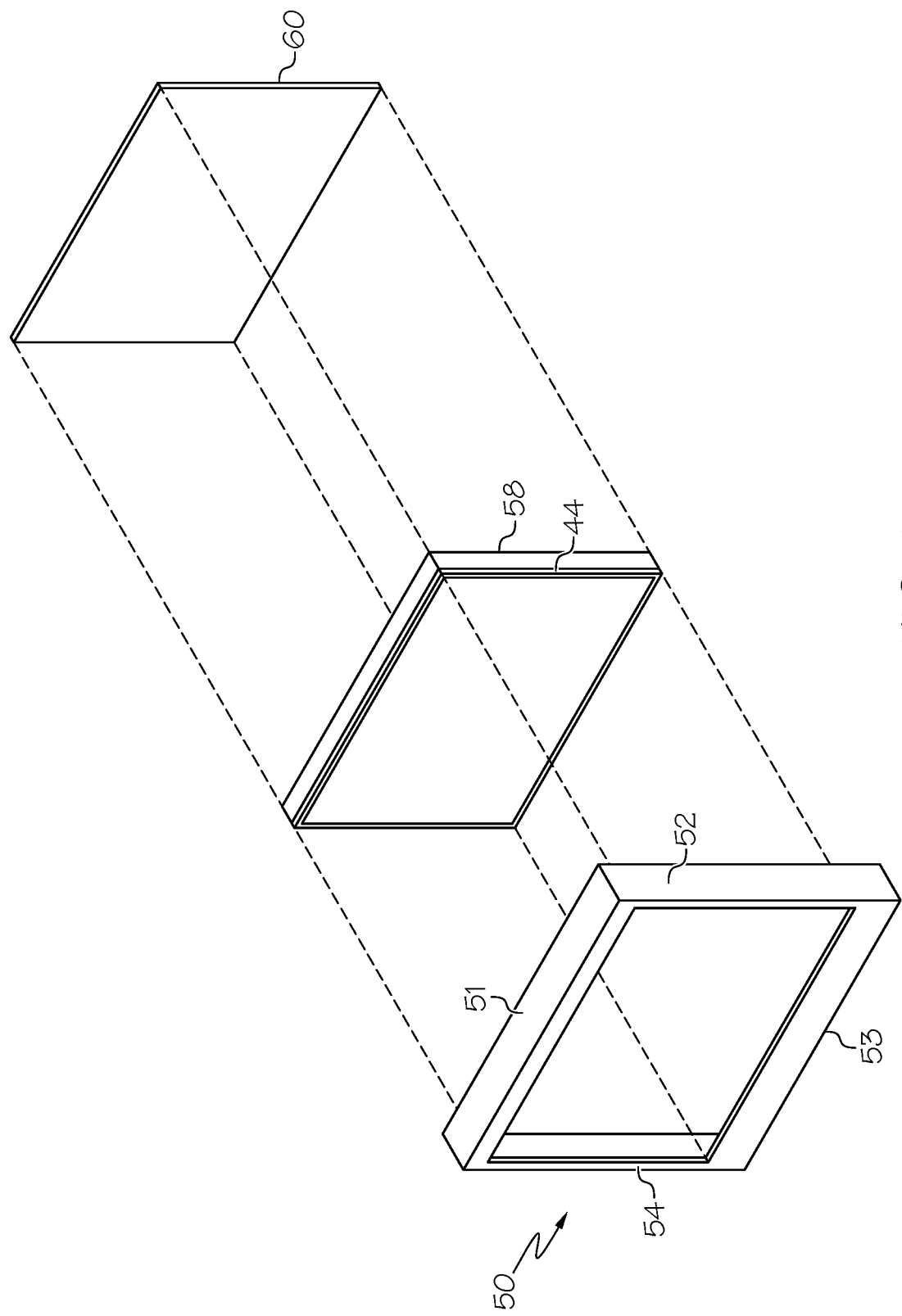
FIG. 4 is a partially exploded view of a front unit of the visual display system of FIG. 3, in accordance with an exemplary embodiment.

Referring to FIG. 2, a schematic view is shown of an exemplary visual display assembly 36, which may be representative of any of the visual display assemblies 36-41. Visual display assembly 36 includes a front unit 42 with a display panel in the form of a liquid crystal display screen 44, that has a transparent front surface 46 through which information is displayed and that faces into the cockpit 20. The front surface 46 is part of a layer made of glass, flame retardant polycarbonate, or another flame-resistant material. The liquid crystal display screen 44 is surrounded or framed on four sides by bezel 50, which is made of metal, such as aluminum, or other material. With additional reference to FIG. 4, the bezel 50 closes four sides 51-54 of the front unit 42. The bezel 50 includes an extension 56 that extends around all four sides 51-54, which is also made of metal and may be an integral part of the bezel 50 or a separate connected piece.

The front unit 42 includes internal componentry 58 that may include, for example, light guide plates, reflector films, diffusers and other components or films. These items of the internal componentry 58 may be made of polymers such as Polystyrene, Acrylic, etc. These plastics may combust when exposed to flame and therefore, when subjected to flame under DO-160 testing may ignite. A circuit card assembly (CCA) 60 is positioned behind the internal componentry 58 and engages the sides 51-54 closing the opening 62 that would otherwise exist at the rear 64 of the front unit 42. The CCA 60 includes a substrate 68 formed from a composite that contains a matrix (such as an epoxy resin) and a reinforcement (such as woven glass fibers). The rear side 70 of the substrate 68 is coated with a metal layer 72, made of a material such as copper, tin, aluminum, or another metal. The metal layer 72 may be applied by deposition, adhesive, fastening, or other techniques. The metal layer 72 serves as the sixth aside of the enclosure 74 for the front unit and is continuous over the rear side 70 of the CCA 60, except at the connectors 78, 80. The enclosure 74 includes the front surface 46 of the transparent layer, the four sides 51-54 and the metal layer 72. In the case of exposure to flame, any combustion of the internal componentry 58 is thereby contained by the enclosure 74 and will burn out or self-extinguish under containment.

Figure 5:
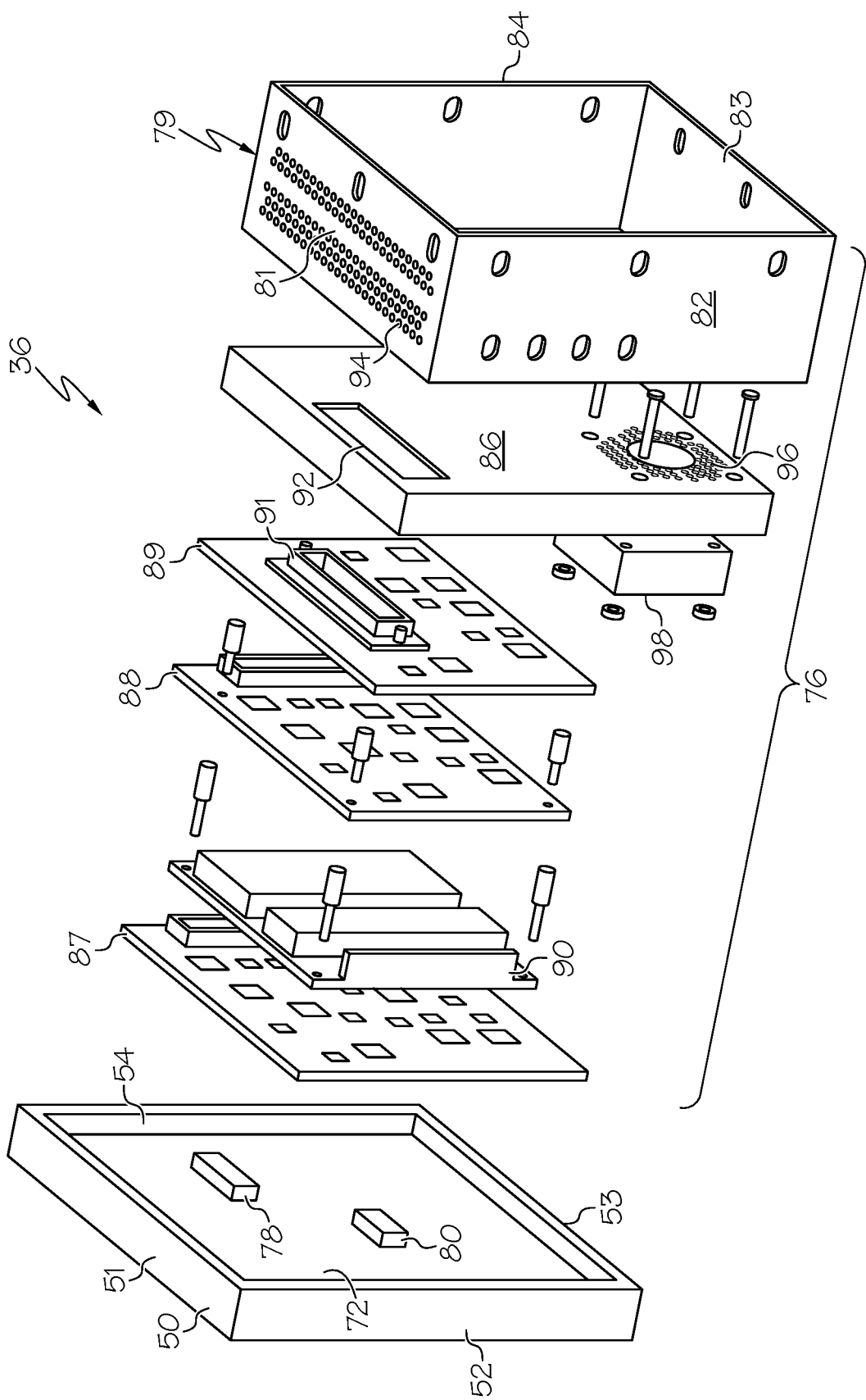
FIG. 5 is an exploded view of the visual display system, in accordance with an exemplary embodiment.

Forming the metal layer 72 on the CCA 60 provides for a lighter weight and readily assembled visual display assembly 36. For example, the metal layer 72 does not restrict the ability to locate connection points on the CCA 60, such as those required to connect with a rear unit 76, for example at mating connectors 78, 80. With additional reference to FIG. 5, the rear unit 76 includes a case 79, that includes four sides 81-84, corresponding to the sides 51-54. A rear plate 86 forms a fifth side at the rear of the rear unit 76. Electronic devices including a set of three printed CCAs 87, 88, 89 are carried within the rear unit 76. The CCA 87 is configured to connect with the connectors 78, 80 and carries a heat sink 90. The CCA 89 includes a connector 91 that extends through an opening 92 in the rear plate 86 to connect the visual display assembly 36 with systems of the aircraft.

The rear unit 76 generates heat and so the case 82 includes vent holes 94, the rear plate 86 includes vent holes 96, and the rear plate 86 carries a fan 98 for circulating ventilation air through the rear unit 76. The interior of the front unit 42 is separated from the ventilation by the CCA 60 and the metal layer 72. In general, the rear unit includes internal components that are non-flammable or self-extinguishing. Accordingly, separation of the internal componentry 58 in the front unit 50 from the rear unit 76 is needed to provide flammability resistance for the internal componentry 58 of the front unit 50. This separation is accomplished by the metal layer 72.

Through the foregoing, flammability resistance is accomplished through a complete enclosure of a visual display assembly's front unit by a four-sided metal bezel, a glass front surface/layer and a rear CCA coated with metal. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An assembly comprising:
an electronic unit having a front unit defining an interior and having a rear unit containing electronic devices, the electronic unit including:
a bezel extending around and closing four sides of the interior, the bezel defining a front opening to the interior and a rear opening to the interior;
a circuit card assembly extending across the rear opening and engaging the bezel at each of the four sides to close the rear opening; and
a visual display panel extending across the front opening and engaging the bezel at each of the four sides, the visual display panel closing the front opening, the visual display panel including a flame resistant material,
wherein the circuit card assembly is coated with a metal layer configured to contain flame within the interior,
wherein the interior is contained by the bezel, the circuit card assembly and the visual display panel as a flame resistant unit separated from the rear unit by the circuit card assembly.

2. The assembly of claim 1, wherein the visual display panel is covered by a transparent non-flammable surface.

3. The assembly of claim 2, wherein the circuit card comprises a substrate with plural electronic connectors connected with the visual display panel.

4. The assembly of claim 2, comprising internal componentry disposed between the transparent substantially non-flammable surface and the metal layer, wherein the internal componentry is flammable.

5. The assembly of claim 4, wherein the internal componentry comprises a polymer film material.

6. The assembly of claim 1,
wherein the rear unit defines a second interior and including:
a case that defines the second interior with a front side that faces the electronic unit;
electronic devices contained in the second interior and coupled with the circuit card assembly; and
a fan configured to provide ventilation to the second unit, wherein the interior of the front unit is blocked from the ventilation.

7. The assembly of claim 6, comprising a rear plate substantially closing a rear side of the rear unit, wherein the metal layer closes the front side of the rear unit.

8. The assembly of claim 1, comprising an instrument panel of an aircraft defining an opening, wherein the assembly is disposed in the opening.

9. The assembly of claim 1, wherein the rear unit defines a second interior and comprising at least one electrical connector on the circuit card assembly, wherein the metal layer is continuous over a surface of the circuit card assembly facing the second interior, except at the at least one electrical connector.

10. The assembly of claim 1, wherein the circuit card assembly comprises a substrate and the metal layer is disposed on the substrate, wherein the metal layer comprises a copper material.

11. The assembly of claim 1, comprising an electrical connector on the circuit card assembly, wherein the metal layer completely covers a rear side of the circuit card assembly except over the connector.

12. A visual display assembly for an instrument panel, the assembly comprising:
a front unit defining a first interior and including:
a visual display panel with a transparent substantially non-flammable surface disposed on a first side of the visual display panel;
a circuit card assembly disposed on a second side of the visual display panel; and
a bezel surrounding four sides of the visual display panel, the bezel defining a front opening to the interior and a rear opening to the interior, the visual display panel closing the front opening and the circuit card assembly closing the rear opening; and
a rear unit defining a second interior and including:
a case with five substantially closed sides and an open side that faces the front unit; and
electronic devices contained in the second interior and coupled with the circuit card assembly;
wherein the front and rear units are disposed adjacent each other, with the circuit card assembly facing the open side, the circuit card assembly separating the first interior from the second interior, the circuit card assembly coated with a metal layer to inhibit flame propagation between the first and second interiors and to contain flame within the first interior.

13. The assembly of claim 12, comprising an extension extending from the bezel and encircling and engaging the circuit card assembly.

14. The assembly of claim 12, wherein the circuit card comprises a substrate with plural electronic connectors connected with the electronic devices.

15. The assembly of claim 12, comprising a fan configured to ventilate the second unit, wherein the first interior is blocked from the ventilation.

16. The assembly of claim 12, wherein the metal layer closes the rear opening of the first interior and the transparent substantially non-flammable surface closes the front opening of the first interior.

17. The assembly of claim 12, comprising an electrical connector on the circuit card assembly, wherein the metal layer completely covers a rear side of the circuit card assembly except over the connector.

18. The assembly of claim 12, comprising a rear plate substantially closing one of the substantially closed sides the rear unit, wherein the metal layer closes the open side of the rear unit.

19. The assembly of claim 12, wherein the internal componentry comprises a flammable film.

20. A visual display assembly for an instrument panel, the assembly comprising:
  a front unit defining a first interior containing flammable internal componentry and including:
    a visual display panel with a transparent substantially non-flammable layer disposed on a first side of the visual display panel that has a surface facing out of the instrument panel;
    a circuit card assembly disposed on a second side of the visual display panel that is opposite the first side; and
    a bezel surrounding four sides of the visual display panel, the bezel defining a front opening to the first interior and a rear opening to the first interior, the visual display panel closing the front opening and the circuit card assembly engaging the bezel at each of the four sides and closing the rear opening; and
  a rear unit defining a second interior and including:
    a case with four substantially closed sides and an open side that faces the front unit, the four substantially closed sides of the case engaging the bezel; and
    electronic devices contained in the second interior and coupled with the circuit card assembly;
  wherein the front and rear units are connected together, with the circuit card assembly having a metal layer that closes the open side and the rear opening, the circuit card assembly separating the first interior from the second interior, the metal layer configured to inhibit flame propagation between the first and second interiors and to contain flame within the first interior.

* * * * *